United States Patent
Kosaraju et al.

(10) Patent No.: US 6,178,805 B1
(45) Date of Patent: Jan. 30, 2001

(54) METHOD AND APPARATUS FOR SIDE IMPACT TESTING OF MOTOR VEHICLES AT A SUB-SYSTEM LEVEL

(75) Inventors: Hari K. Kosaraju, Rochester Hills; James Chapp, Jr., West Bloomfield; Samuel Shamir, Bloomfield Hills; Henry J. Kessler, Fraser, all of MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 08/898,397

(22) Filed: Jul. 22, 1997

(51) Int. Cl.[7] .................................................. G01M 7/00
(52) U.S. Cl. ............................................................ 73/12.04
(58) Field of Search ............................... 73/865.3, 866.5, 73/12.01, 12.04, 12.07, 12.09

(56) References Cited

U.S. PATENT DOCUMENTS

| | | | |
|---|---|---|---|
| 4,524,603 | * | 6/1985 | Hargunani et al. .................. 73/12.01 |
| 5,483,845 | * | 1/1996 | Stein et al. ........................... 73/12.01 |
| 5,623,094 | * | 4/1997 | Song et al. ........................... 73/12.07 |
| 5,783,739 | * | 7/1998 | Miller ................................... 73/12.04 |
| 5,861,544 | * | 1/1999 | Kosaraju et al. .................... 73/12.04 |
| 5,872,321 | * | 2/1999 | Yannaccone ......................... 73/12.04 |
| 5,929,348 | * | 7/1999 | Stein et al. ........................... 73/865.3 |

* cited by examiner

Primary Examiner—George Dombroske
(74) Attorney, Agent, or Firm—Roland A. Fuller, III

(57) ABSTRACT

A method and apparatus for side impacting testing of motor vehicles at a sub-system level. By advancing a side impact barrier into the vehicle shell mounted on the fixture at a predetermined speed, full-scale crashworthiness for side impact collisions can be predicted, thereby significantly reducing development cost and time. The fixture includes a base for supporting the vehicle shell, a side portion for reinforcing a lateral side of the vehicle shell and protecting against deformation and a roll-over prevention structure. The fixture additionally includes a plurality of casters attached to the base.

11 Claims, 2 Drawing Sheets

METHOD AND APPARATUS FOR SIDE IMPACT TESTING OF MOTOR VEHICLES AT A SUB-SYSTEM LEVEL

BACKGROUND OF THE INVENTION

1. Technical Field

The present invention generally relates to testing of motor vehicles for structural integrity and occupant protection, and more particularly relates a method and apparatus for side impact testing of motor vehicles at a sub-system level.

2. Discussion

Prior to production, motor vehicles are subjected to full-scale crash testing to ensure structural integrity and occupant protection. Due to the amount of domestic and foreign impact standards and other requirements a manufacturer may self-impose, full-scale testing involves significant monetary and time commitments. Typically, prototype vehicles are specifically developed for testing and are scrapped after a single impact test. It is desirable to limit the use of full-scale testing to verification of vehicle design for crashworthiness to the extent possible.

It is known to employ computer modeling to simulate impact testing. Such tools have proven to be extremely valuable in initial design of vehicles and vehicle components. However, due to the dynamic interaction between the numerous components of a vehicle, it is impossible to precisely evaluate the crashworthiness of a vehicle through computer modeling. Therefore, it is desirable to conduct impact testing at a sub-system level in order to more accurately predict the crashworthiness of a vehicle prior to full-scale impact testing.

SUMMARY OF THE INVENTION

It is a principal object of the present invention to provide a method and apparatus for impact testing a vehicle shell to predict vehicle crashworthiness at a sub-system level.

It is another object of the present invention to provide a method and apparatus for significantly reducing development time and cost necessary to satisfy full-scale impact test requirements.

In one form, the present invention provides a fixture for impact testing a vehicle shell to predict vehicle crashworthiness at a sub-system level. The fixture includes a base having an upper surface for securing the vehicle shell thereto. The fixture further includes a side support structure interconnected to the base. The side support structure is operative to reduce deformation to a first lateral side of the vehicle shell when a second lateral side of the vehicle shell is subjected to impact. Additionally, the fixture includes a plurality of casters attached to the base.

In another form, the present invention provides a method of impact testing a vehicle shell to predict vehicle crashworthiness in a side impact at a subsystem level. The method includes the general steps of: (1) providing a fixture; (2) mounting the vehicle shell to the fixture; (3) impacting the vehicle shell with a barrier at a predetermined speed; and (4) analyzing the vehicle shell to predict vehicle crashworthiness.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
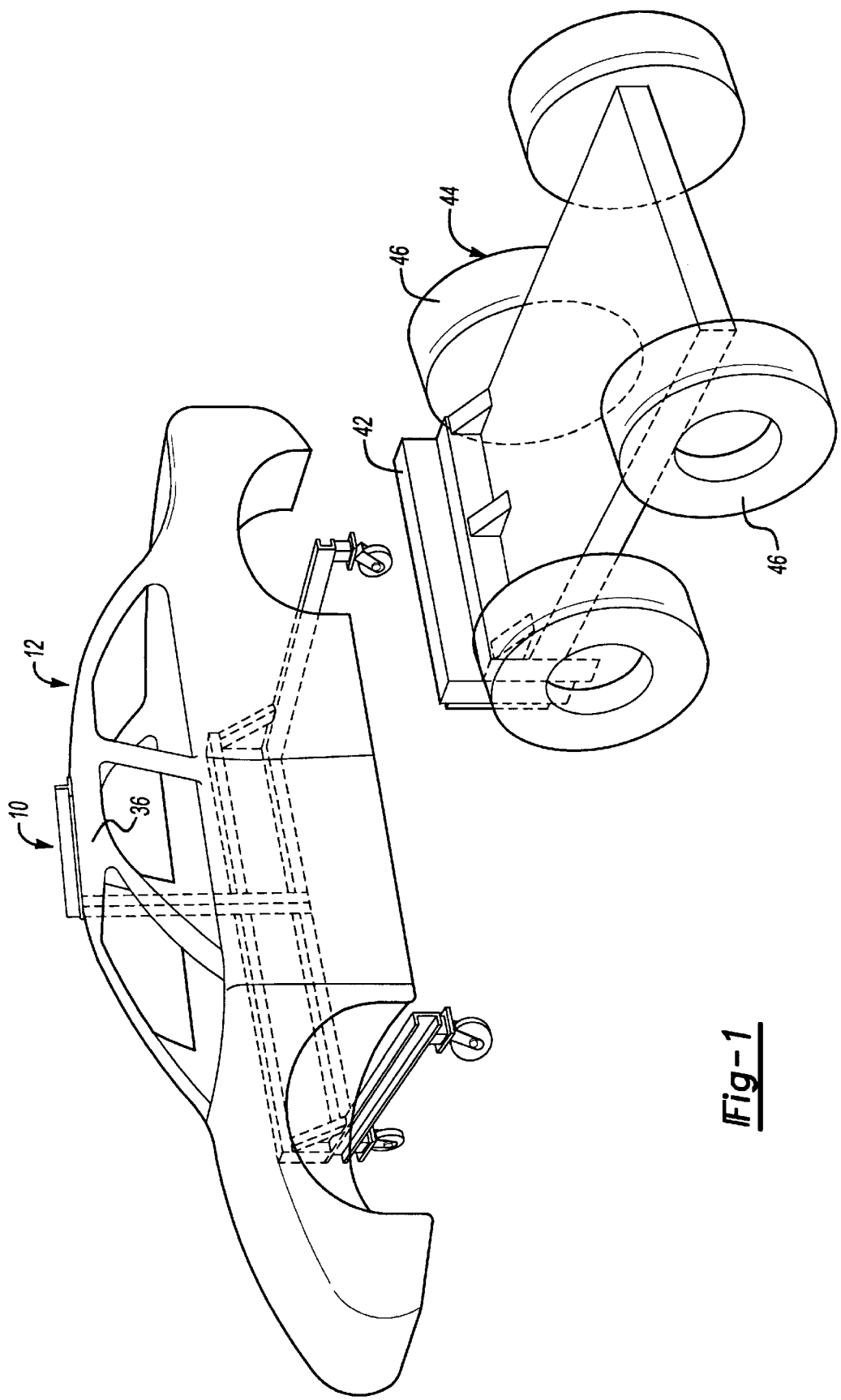
FIG. 1 is an environmental view illustrating a fixture constructed in accordance with the teachings of the present invention shown operatively associated with a vehicle shell and an impact sled.

With reference generally to the drawings, a fixture for impact testing a vehicle shell to predict vehicle crashworthiness at a sub-system level is generally identified in the drawings with reference numeral 10. The fixture 10 is shown in FIG. 1 operatively arranged with a vehicle shell 12 and a mobile unit or impact sled 14.

Among the various tests which are generally conducted on most motor vehicles is a side impact test in which a side impact barrier representative of a vehicle is driven into a full-scale vehicle at a pre-determined speed. The energy from the impact is primarily absorbed by one lateral side of the vehicle. Side impact testing is conducted to assess vehicle crashworthiness (e.g. intrusion within the passenger compartment). It is this particular test for which the fixture 10 of the present invention is specifically designed. However, the teachings of the present invention are applicable to other types of crashworthiness testing.

Figure 2:
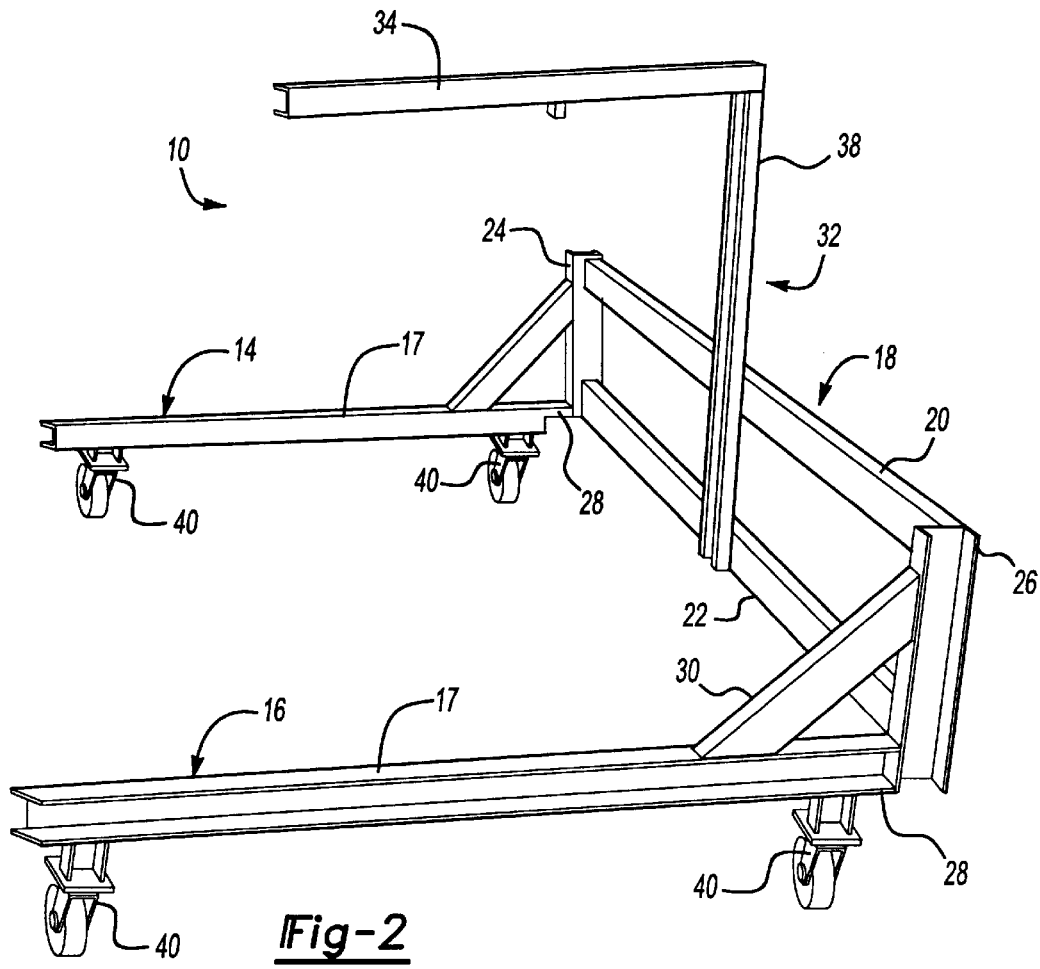
FIG. 2 is an enlarged perspective view of the fixture of the present invention.

With continued reference to FIGS. 1–2, the fixture 10 of the preferred embodiment of the present invention will now be further discussed. The fixture 10 is shown to include a base including a pair of spaced apart beams or rails 14 and 16. The spaced apart beams 14 and 16 are preferably parallel to one another and each include flat upper surfaces 17 for supporting the vehicle shell 12.

The fixture 10 further includes an intermediate portion 18 interconnecting the first and second rails 14 and 16. In the embodiment illustrated, the intermediate portion 18 includes a pair of vertically spaced apart rails 20 and 22 which cooperate to support an adjacent lateral side of the vehicle shell 12 and thereby minimize deformation during side impact testing. The first and second rails 20 and 22 of the intermediate portion 18 are interconnected by a pair of rail segments 24 and 26 welded or otherwise fastened to opposite ends of the rails 20 and 22. The rail segments 24 and 26 are in turn welded or otherwise suitably attached to a first end 28 of each of the horizontal rails 14 and 16. For structural integrity, a diagonal brace 30 is disposed between each of the horizontal rails 14 and 16 and a corresponding one of the rail segments 24 and 26.

The fixture 10 is further shown to preferably include a roll-over prevention structure 32 interconnected to the base and upwardly extending. The roll-over prevention structure 32 is operative to prevent the vehicle shell 12 from rolling over when subject to impact. In the embodiment illustrated, the roll-over prevention structure 32 includes a substantially horizontal member 34 adapted to be disposed immediately above roof 36 of the vehicle 12. The roll-over prevention structure 32 further includes a substantially vertical member 38 interbetween the base and the substantially horizontal member 34. As shown, the vertical member 38 is welded or otherwise suitably attached to the vertically spaced apart rails 20 and 22 of the intermediate portion 18.

In the preferred embodiment, the elements of the fixture 10 are constructed from steel. However, alternate material of sufficient strength may be employed.

The fixture 10 of the present invention is further shown to include a plurality of castors 40. As shown, the fixture 10 preferably includes four (4) castors. The castors 40 are of conventional construction and permit vertical adjustment of the fixture 10 in a known manner. As a result, the height of the vehicle shell 12 can be adjusted to accommodate specific testing requirements. Additionally, the castors 40 facilitate movement of the fixture 10 before and after impact testing.

In use, the vehicle shell 12 is impacted with a device such as a side impact barrier 42 carried by a cart or impact sled 44. The impact sled 44 is illustrated to include a plurality of wheels 46. The size and weight of the impact sled 44 are chosen for the specific crashworthiness testing involved. More specifically, the weight and height of the impact sled 44, among other factors, are chosen such that impact testing of the vehicle shell 12 is representative of full scale impact testing. Any desired form of device desired may be used to perform the impact.

Figure 3:
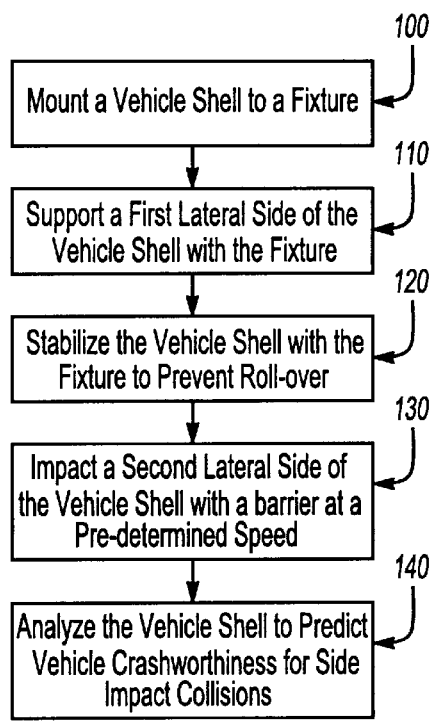
FIG. 3 is a flow diagram illustrating the general steps of the preferred method of the present invention.

With continued reference to FIGS. 1–2 and additional reference to FIG. 3, the preferred method of the present invention will be described. The first general step 100 of the method of the present involves mounting the vehicle shell 12 to the fixture 10. The vehicle shell 12 is supported on the upper surfaces 17 of the horizontal rails 14 and 16 of the base. Preferably, the vehicle shell 12 is welded or otherwise suitably fastened to the rails 14 and 16. Similarly, the horizontal member 34 is welded or otherwise suitably attached to the roof 36 of the vehicle shell 12.

The second general step of the method of the present invention 110 involves supporting a first lateral side of the vehicle shell 12 with the fixture 10. As noted above, support is provided by the vertically spaced apart rails 20 and 22 of the intermediate portion 18.

The next general step 120 of the method of the present invention involves stabilizing the vehicle shell 12 with the fixture 10 to prevent roll-over. The roll-over prevention structure 32 of the fixture 10 extends adjacent the first lateral side of the vehicle end adjacent the roof 36.

The next general step 130 of the present invention involves impacting a second lateral side of the vehicle shell 12 with the side impact barrier 42 at a predetermined speed. In one application, the vehicle shell 12 is impacted with the side impact barrier 42 at a speed of approximately 14 miles per hour. However, it will be appreciated by those skilled in the art that the speed of impact may be varied as desired. The impact sled 44 is advanced into the vehicle shell 12 in a conventional manner to contact the vehicle shell 12 at a predetermined height.

The final general step 140 of the present invention involves analyzing the vehicle 12 shell to predict vehicle crashworthiness. The occupant compartment intrusion and other factors calculated during the impact testing of the vehicle shell 12 are indicative of full scale impact testing. Upon analyzing the test results, subsequent design iterations of the components of the vehicle shell 12 may be made to improve crashworthiness of the vehicle shell 12 (e.g. to reduce intrusion into the passenger compartment).

While the above description constitutes the preferred embodiment of the invention, it will be appreciated that the invention is susceptible to modification, variation, and change without departing from the proper scope or fair meaning of the accompanying claims.

We claim:

1. A fixture for impact testing a vehicle shell to predict vehicle crashworthiness at a sub-system level, the fixture comprising:

a base for supporting the vehicle shell, said base including an upper surface for securing the vehicle shell thereto;

a side support structure interconnected to said base, said side support structure operative to reduce deformation to a first lateral side of the vehicle shell when a second lateral side of the vehicle shell is subjected to impact;

a plurality of castors attached to said base; and a roll-over prevention structure interconnected to said base and upwardly extending relative thereto, said roll-over prevention structure operative to prevent the vehicle shell from rolling over when subjected to impact, said roll-over prevention structure including a substantially horizontal member and a substantially vertical member, said substantially horizontal member adapted to be disposed immediately superadjacent to a roof of the vehicle shell and fixedly attached thereto, said substantially vertical member interbetween said base and said substantially horizontal member.

2. The fixture for impact testing a vehicle shell of claim 1 wherein said side support structure is operative to reduce deformation to a first lateral side of the vehicle shell when a second lateral side of the vehicle shell is subjected to impact.

3. The fixture for impact testing a vehicle shell of 1, wherein each castor of said plurality of castors is vertically adjustable for positioning the vehicle shell at a desired height.

4. The fixture for impact testing a vehicle shell of claim 1, wherein said support structure includes a pair of horizontally extending rails.

5. The fixture for impact testing a vehicle shell of claim 4, wherein said pair of horizontally extending rails are vertically spaced apart and substantially parallel to one another.

6. The fixture for impacting testing a vehicle shell to predict full-scale crashworthiness in side impact collisions of claim 4, wherein said upwardly extending structure includes a substantially horizontal member adapted to be disposed immediately superadjacent to a roof of the vehicle shell and fixedly attached thereto.

7. The fixture for impacting testing a vehicle shell to predict full-scale crashworthiness in side impact collisions of claim 4, wherein said upwardly extending structure further includes a substantially vertical member interbetween said base and said substantially horizontal member.

8. A fixture for impact testing a vehicle shell to predict full-scale crashworthiness in side impact collisions at a sub-system level, the fixture comprising:

a base for supporting the vehicle shell at a predetermined height, said base including first and second horizontal, spaced-apart beams;

an intermediate portion interconnecting said first and second beams;

a plurality of castors attached to said base; and an upwardly extending portion interconnected to said base and operative for preventing rollover of the vehicle shell when subjected to impact.

9. The fixture for impact testing a vehicle shell to predict full-scale crashworthiness in side impact collisions of claim 8, wherein each castor of said plurality of castors is vertically adjustable for positioning the vehicle shell at a desired height.

10. The fixture for impact testing a vehicle shell to predict full-scale crashworthiness in side impact collisions of claim 8, wherein said intermediate portion includes a pair of horizontally extending rails for reducing deformation to a first lateral side of the vehicle shell when a second lateral side of the vehicle shell is subjected to impact.

11. The fixture for impact testing a vehicle shell to predict full-scale crashworthiness in side impact collisions of claim 10, wherein said pair of horizontally extending rails are vertically spaced apart and substantially parallel to one another.

* * * * *